May 16, 1967 R. R. GOINS 3,319,437
ANNULAR CRYSTAL PURIFICATION COLUMNS
Filed July 6, 1964 3 Sheets-Sheet 2

INVENTOR.
R. R. GOINS
BY Young & Quigg
ATTORNEYS

INVENTOR.
R. R. GOINS
BY Young & Quigg
ATTORNEYS

United States Patent Office 3,319,437
Patented May 16, 1967

3,319,437
ANNULAR CRYSTAL PURIFICATION COLUMNS
Robert R. Goins, Bartlesville, Okla., assignor to Phillips Petroleum Company, a corporation of Delaware
Filed July 6, 1964, Ser. No. 380,395
7 Claims. (Cl. 62—123)

This invention relates to crystal purification columns of the type disclosed in U.S. Patent 2,854,494 of Rosswell W. Thomas of Sept. 30, 1958, but in which a novel annular chamber is provided in order to increase the circumference or periphery available for filtering purposes from $2\pi R_1$, where $R_1$ is the radius of a cylindrical chamber and $\pi$ is 3.1416, by at least 25 percent. This may be done by inserting a cylindrical, axially-disposed filter adding a circumference available for filtering of $2\pi R_2$, where $R_2$ is the radius of the axial filter. In another aspect, an annular, axially-disposed filter may be inserted adding two circumferences available for filtering of $2\pi(R_3+R_4)$ where $R_3$ and $R_4$ are the radii of the inner and outer walls of the annular filter and $2\pi(R_1+R_3+R_4)$ is at least 25 percent greater than $2\pi R_1$. In both aspects, it relates to decreasing the greatest distance liquid has to travel radially to a filter by about 50 percent or more.

In the prior art, it has been difficult to scale up the cylindrical crystal purification column since the column volume $\pi R_1^2 L$ (where L is the axial extent) goes up as the square of the radius, whereas the filter area for the same axial extent $2\pi R_1 L$ increases only as the radius. Also, the greatest distance that liquid must travel to reach the filter in a cylindrical column is $R_1/2$ and increases with the radius, but in an annular column is only about $$\frac{R_1-R_2}{2}$$

Proper separation of liquid and crystals becomes increasingly difficult in a cylindrical column as the radius increases, the average radial distance the liquid has to travel to the filter increases, and the area of filter per volume of crystals decreases. This difference is not noticeable in columns 10 inches in diameter or less and is not too bad in columns about 10 to 20 inches in diameter, but causes increasing difficulties in separation as the diameter is increased to 60 or more inches, finally reaching the point where further increase in diameter fails to increase the output of purified products of the column. In addition, Perry's Chemical Engineers Handbook, 3rd edition (1950), McGraw-Hill Book Company, New York, page 707, Column 2, items 8 and 11, points out channeling occurs in packing over 2 feet in diameter, and it is well known that filtration rate depends on the driving force divided by the resistance, which resistance increases with the radius of the filter cake of crystals in the column.

The present invention, by adding at least 25 percent to the area of the filter and reducing the greatest distance liquid has to travel radially to a filter by about 50 percent or more, unexpectedly enables the building of larger-diameter, annular crystal purification columns with a greater rate of throughput than cylindrical columns having the same area of crystals in cross section. The over-all diameter and total crystal area of the column is unexpectedly increased without limit if the diameter of the axial cylindrical filter, or the inner and outer diameters of the axially-disposed annular filter, is increased by a suitable amount at the same time. Channeling is also reduced and filter throughput increased unexpectedly by decreasing the greatest radial distance to the filter by 50 percent or more.

In addition, by having an axially-disposed, annular tapering filter, tapering inwardly toward the melting section of the crystallizer, the filter cake of crystals is reformed and channeling reduced between the filter section and the melting section of the crystal purification column.

One object of the present invention is to provide an improved annular and an improved concentric annular and cylindrical crystal purification column, both having a greater throughput, increased purity, reduced channeling, and over-all superior operation to the single cylindrical columns of the prior art.

Another object is to provide a tapered filter, causing reforming of the crystal cake between the filter section and the melting section with reduction of channeling.

Numerous other objects and advantages will be apparent to those skilled in the art upon reading the accompanying specification, claims and drawings.

Figure 4:
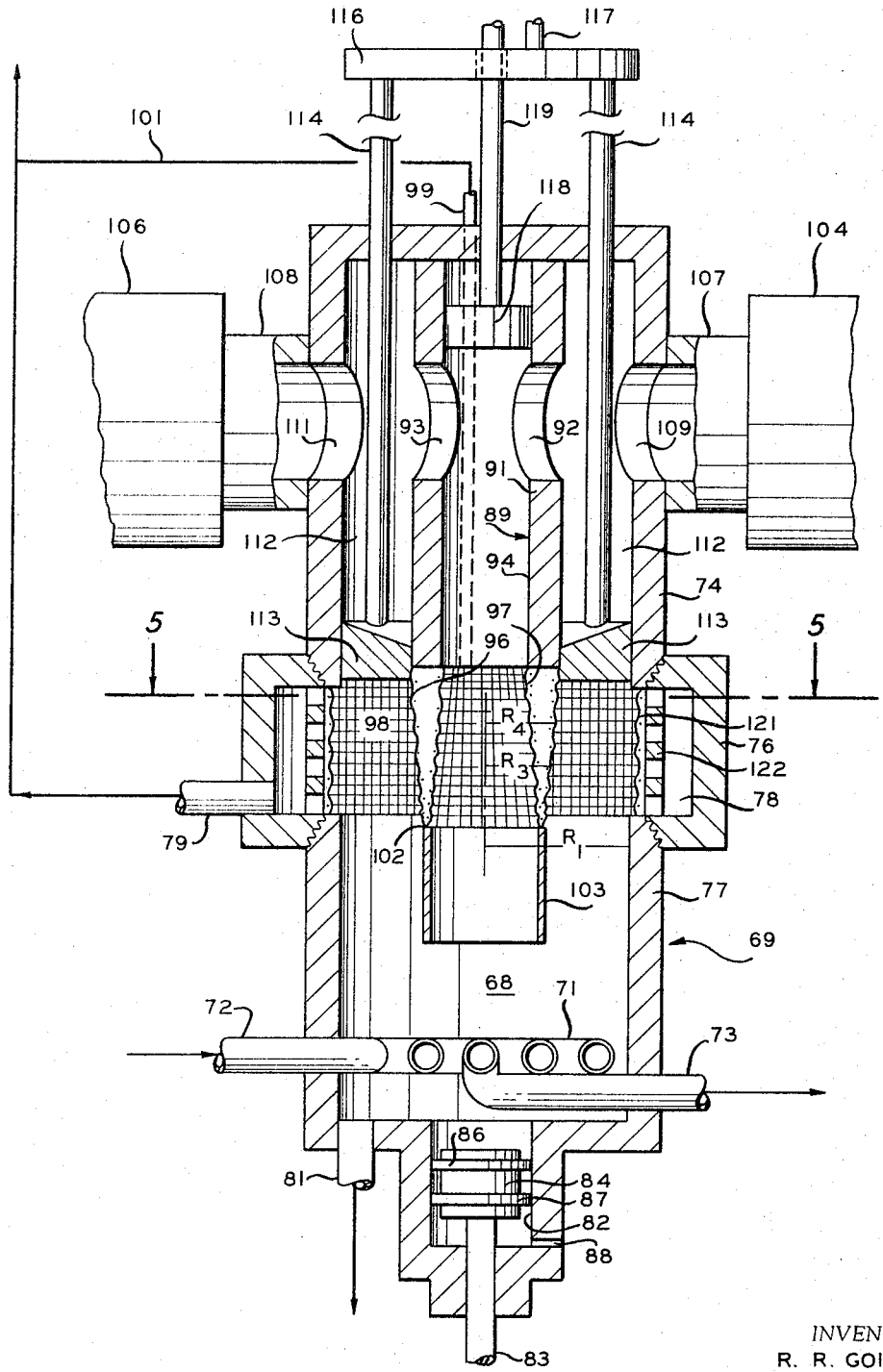

FIGURE 4 is an elevational view, with parts broken away in cross section, of a second modification of a crystal purification column embodying the present invention, comprising an axially-disposed, annular, tapered filter in a cylindrical crystal filter chamber forming a central cylindrical chamber and an outer annular chamber merging into a single cylindrical crystal chamber in the crystal melting zone.

Figure 5:
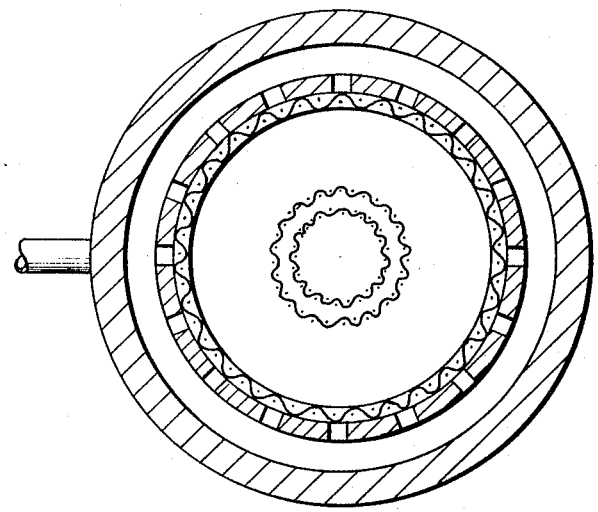

FIGURE 5 is a cross-sectional view taken along the line 5—5 of FIGURE 4 looking in the direction indicated.

Figure 1:
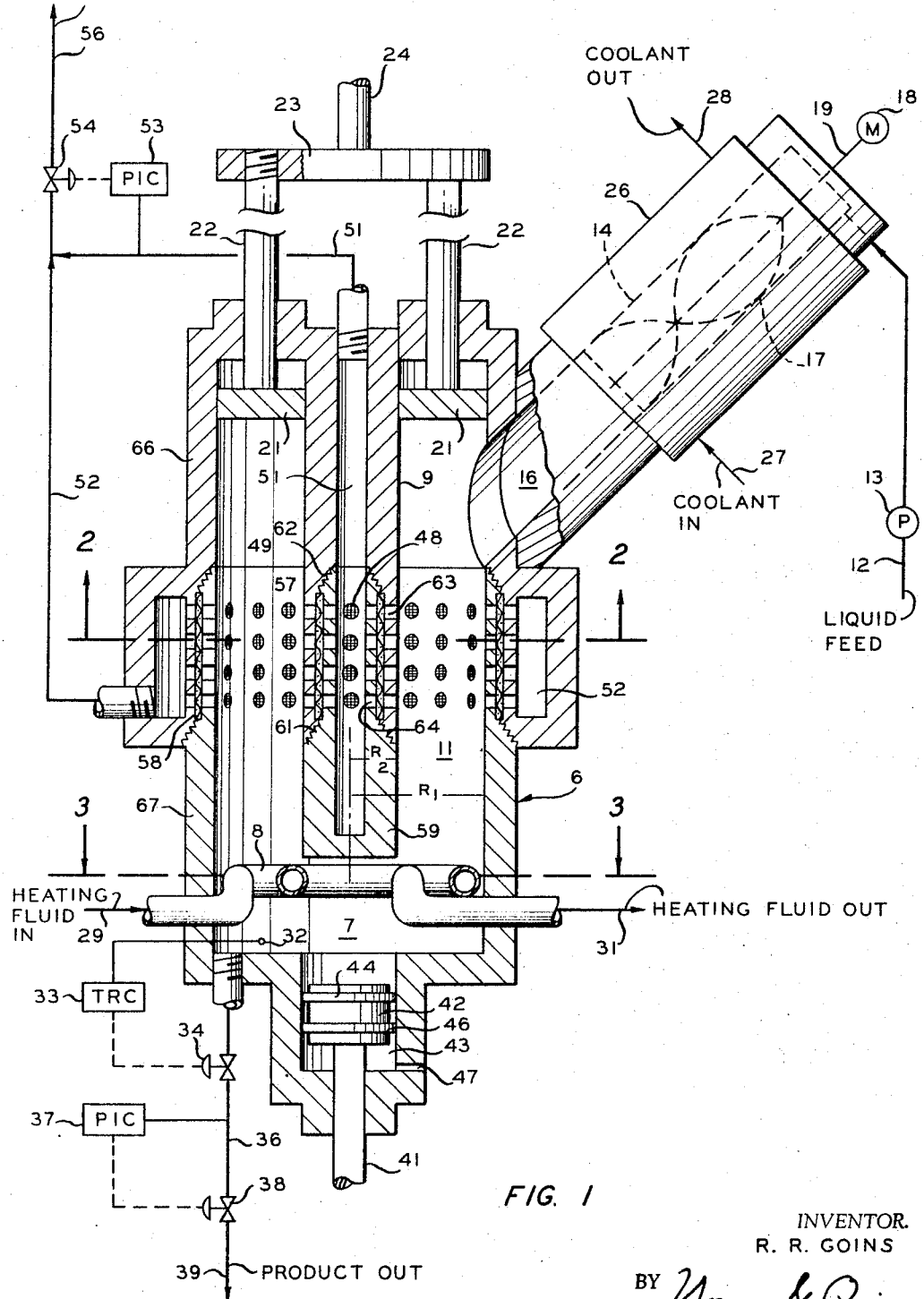
FIGURE 1 is an elevational view, with parts broken away in cross section, of a first modification of a crystal purification column embodying the present invention, comprising an axial cylindrical filter in a cylindrical crystal filter chamber forming an annular crystal chamber.

FIGURE 1 shows a crystal purification column, generally designated as 6, comprising a cylindrical chamber 7 having a radius $R_1$, a crystal-melting heating coil 8 therein, and a central axially-disposed filter column 9 of radius $R_2$ disposed therein forming an annular crystal chamber 11.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction counter-current to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of nonaqueous mixtures, an example of such an application being the separation of paraxylene from a mixture thereof with the other xylene isomers and ethyl benzene.

A liquid feed in line 12, such as beer, wine or other alcohol and water solutions, or other components with different freezing points which may be separated by fractional crystallization, is pumped by pump 13 into a freezing chamber 14, where at least a portion of one component is frozen against the walls of the chamber forming crystals which travel down crystal delivery tube 16 into annular chamber 11. It is preferred to have some form of crystal loosening or scraping means 17, preferably in the form of a screw or helix, which may be driven by motor 18 and shaft 19. In some instances the helix may be so designed as to act as means to force the crystals through passage 16 into chamber 11, but in many instances it is preferred to also have feed means 21 in the form of an annular piston in annular chamber 11, which piston may be moved up and down by any mechanical means, such as piston rods 22, yoke 23 and prime mover 24. In order to freeze crystals on the walls of 14, it is necessary to have a cooling jacket 26 supplied with a suitable fluid coolant through pipe 27, which coolant exits through pipe 28.

The crystals entering through passage 16, with or without the assistance of annular piston 21, form an annular mass in chamber 11, which mass is urged against heater 8 comprising a coil of pipe through which a heating fluid is forced from 29 to 31 and the mass of crystals melt in contact with or adjacent to pipe 8. When the liqued passing through coil 8 into space 7 reaches a predetermined selected temperature at thermocouple 32, the temperature-recording controller 33 opens valve 34 and when the pressure in line 36 goes up sufficiently the pressure-indicating controller 37 opens valve 38, allowing the high melting component of the feed to pass as a pure product out of line 39.

If desired, and it is generally preferable, a pulsing flow can be induced in this liquid by reciprocating piston rod 41 and piston 42 in cylinder 43 connected with space 7. Piston 42 is generally provided with piston rings 44 and 46 to reduce leakage, and cylinder 43 may be vented through vent 47 to the atmosphere.

As mentioned above, not all of the liquid passes out line 39, but a considerable amount is forced as reflux up into the crystals in annular chamber 11 thereby displacing occluded liquid in the crystals out through filters 48 and 49 into conduits 51 and 52, respectively, the pressure in conduit 51 upon reaching a predetermined selected pressure causing pressure-indicator 53 to open valve 54 allowing the mother liquor to vent through conduit 56. The reflux liquid refreezes in the crystal bed and returns with said bed to the melt zone.

As the process of purification of crystals by melting them while refluxing them with crystal melt is generally old in the Schmidt and Thomas patents cited above, it is believed unnecessary to go into further detail about the general process. However, some further description of the novelty of the apparatus of FIGURE 1 that constitutes the present invention will be made. The central, axially-disposed, cylindrical filter 9, which forms the upper portion of cylindrical chamber 7 into an annular chamber 11, increases the linear extent of the circumference of the filtering section from $2\pi R_1$ to $2\pi(R_1+R_2)$ by an amount of at least 25 percent. In other words, $R_2$ is at least one-fourth of $R_1$. Many different constructions can be employed for filters 48 and 49. The construction shown in FIGURE 1 is preferred where there is a high pressure differential between annular chamber 11 and conduits 51 and 52, whereas when this pressure differential is less, the less rugged construction shown in FIGURE 4 may be employed. The invention is in the relative size of the filter area as a whole, rather than in specific filter construction. As shown in FIGURE 1, for high pressure drop the filters 48 and 49 consist of cylindrical filter screens 57 and 58. Cylindrical screen 57 is retained in place between pipes 9 and 59 which are screw threaded together at 61 and 62, pipe 9 having a series of holes 63 and pipe 59 having a series of holes 64 which line up with the pipe between the holes supporting the screen. Cylindrical screen 58 is similarly supported between body members 66 and 67.

Figure 2:
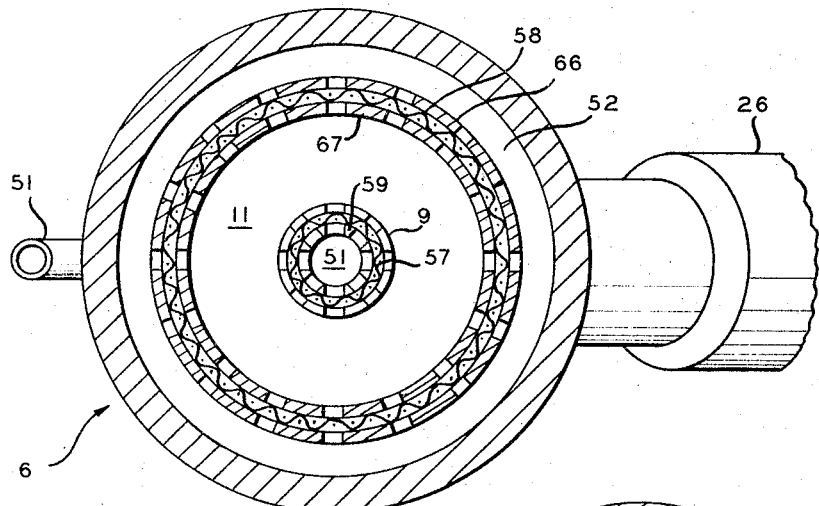
FIGURE 2 is a cross-sectional view taken along the line 2—2 of FIGURE 1 looking in the direction indicated.
Figure 3:
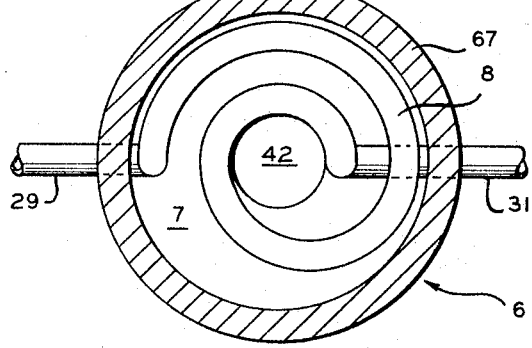
FIGURE 3 is a cross-sectional view taken along the line 3—3 of FIGURE 1 looking in the direction indicated.

FIGURES 2 and 3, being cross sections of FIGURE 1, obviously do not need any further description.

In FIGURE 4 the cylindrical chamber 68 of the crystal purification column, generally designated as 69, contains a coil 71 for heating fluid which is forced in inlet 72 and emerges from outlet 73. The body of 69 is formed of an upper cylindrical section 74 screw threaded to a filter-supporting section 76, which in turn is screw threaded to a lower cylindrical section 77. In filter section 76 there is a mother liquor collection space 78 leading to mother liquor outlet conduit 79. In the bottom of chamber 78 there is a product outlet conduit 81, and if desired there is a cylinder 82 provided with a reciprocating piston rod 83 having a liquid pulsating piston 84 guided in cylinder 82 which may be provided with piston rings 86 and 87. A vent passage 88 may be provided leading from the bottom of cylinder 82 to the atmosphere.

As novel construction in the top of cylindrical chamber 68, there is provided an axially-disposed, annular, tapered filter generally designated as 89, having a supporting cylinder 91 provided with radial inlets 92 and 93 and a central passage 94. Mounted on the bottom of tube 91 is an annular, tapered screen filter composed of an outer frusto-conical screen 96 and an inner frusto-conical screen 97 having an annular space 98 therein for the collection of mother liquor, which flows off through a mother liquor conduit shown in dotted lines at 99 leading to mother liquor conduit 101 which joins conduit 79. The lower ends of screens 97 and 98 may be joined at 102 as the bottom of filter 89; however, I prefer to have a limited cylindrical extension 103 extending from the bottom of screens 96 and 97 down into the chamber 68 to a point nearer the heating coil 71.

A plurality of chillers 104 and 106 may be connected by conduits 107 and 108, respectively, to openings 109 and 111 leading into annular space 112. Chillers 104 and 106 are similar to chiller 26 of FIGURE 1, except they are at right angles to chamber 112 and preferably lined up with openings 92 and 93.

In order to feed crystals down through annular space 112 and central space 94, an annular piston 113 may be reciprocated by piston rods 114, yoke 116, and prime mover 117 in space 112 while cylindrical piston 118 may be reciprocated by piston rod 119 in space 94. Pistons 118 and 113 may move in unison, if desired, or independently. However, it is preferred to operate them alternately, that is piston 118 goes up when piston 113 is coming down, and vice versa. Because of the particular construction of the chambers 94, 112 and 68, the crystals are compacted in 68 and are pressed against heating coil 71 with constant pressure, regardless of the position of the pistons 113 and 118.

Because of the lower pressure differential between space 68 and 78 in FIGURE 4, screen 121 can be a cylinder supported in the simple manner shown between sleeves 74 and 77, being retained in position by a perforated cylinder which may be an integral part of filter section 76, it being obviously easy to form such hollow perforated parts as 76 by casting processes old in the prior art.

It will be noted that the linear extent of the circumference of the filter section is increased by screens 96 and 97 from $2\pi R_1$, furnished by screen 121, by the additional amount of $2\pi(R_3+R_4)$, where $R_3$ and $R_4$ are average radii, which amount should be at least 25 percent. It will also be noted that as the crystals descend in tube 94 and in annular space 112 they are realigned as they pass the bottom of tube 103 into a compact mass in chamber 68, which reduces the possibility of channeling through heater 71 and filters 96, 97 and 121. It will be noted that a very gradual change in area occurs as the crystal beds pass down past tapered screens 96 and 97 and sleeve 103 into chamber 68. As a further aid in gradual realignment of the crystal bed to prevent channeling, the cylindrical wall 77 can be made to taper inwardly and downwardly (not shown) to gradually restrict the area of the crystal bed as it passes downwardly through chamber 68 to heater coil 71. If desired, cylindrical sleeve 103 can be made to taper as a continuation of the surfaces of screens 96 and 97 (not shown) to make the transition in area of the crystal bed even more gradual.

Obviously, product pipe 81 and mother liquor conduits 79 and 101 may be provided with suitable pressure and temperature controllers as already shown in FIGURE 1.

As FIGURE 5 is a cross-sectional view of FIGURE 4, no further description is necessary.

While two particular preferred embodiments of the invention have been shown for purposes of illustration, it should be obvious that the invention is not limited thereto.

Having described my invention, I claim:

1. A crystal purification column having crystal freezing means disposed to discharge crystals into an annular crystal chamber having a crystal melting means and melted product outlet means at its other end, and a filter means for the removal of mother liquor comprising openings around the peripheries of both the inner and outer walls of said annular chamber, the combined peripheries being at least 25 percent greater than the inner periphery of the outer wall.

2. The combination of claim 1 in which an annular piston is disposed to reciprocate in said annular chamber to aid in forcing said crystals against said melting means.

3. A crystal purification column having a cylindrical chamber therein, crystal freezing means disposed to discharge crystals into said chamber, an annular member disposed axially in said chamber and having an opening therethrough to receive crystals therein from said freezing means, a crystal melting means and melted product outlet means in said chamber at the other end of said annular member, and a filter means for the removal of mother liquor comprising openings around the inner periphery of the cylindrical chamber and around the inner and outer peripheries of said annular member, the combined peripheries being at least 25 percent greater than the inner periphery of said cylindrical chamber.

4. The combination of claim 3 in which an annular piston is disposed to reciprocate in the annular space between the inner wall of the cylindrical chamber and the outer wall of the annular member and a cylindrical piston is disposed to reciprocate in the cylindrical passage inside said annular member.

5. The combination of claim 4 in which the pistons are disposed to reciprocate in unison.

6. The combination of claim 4 in which the pistons are disposed to reciprocate independently.

7. The combination of claim 4 in which the pistons are disposed to reciprocate alternately.

References Cited by the Examiner

UNITED STATES PATENTS

| 2,180,553 | 11/1939 | Schuftan | 62—58 |
| 2,241,726 | 5/1941 | Krause | 62—58 |
| 2,765,921 | 10/1956 | Green | 260—707 |
| 2,891,099 | 6/1959 | Skinner | 62—58 |

NORMAN YUDKOFF, *Primary Examiner.*

G. HINES, *Assistant Examiner.*